(No Model.)
E. NORTON & J. G. HODGSON.
CAN CAP SOLDERING MACHINE.
No. 408,316. Patented Aug. 6, 1889.
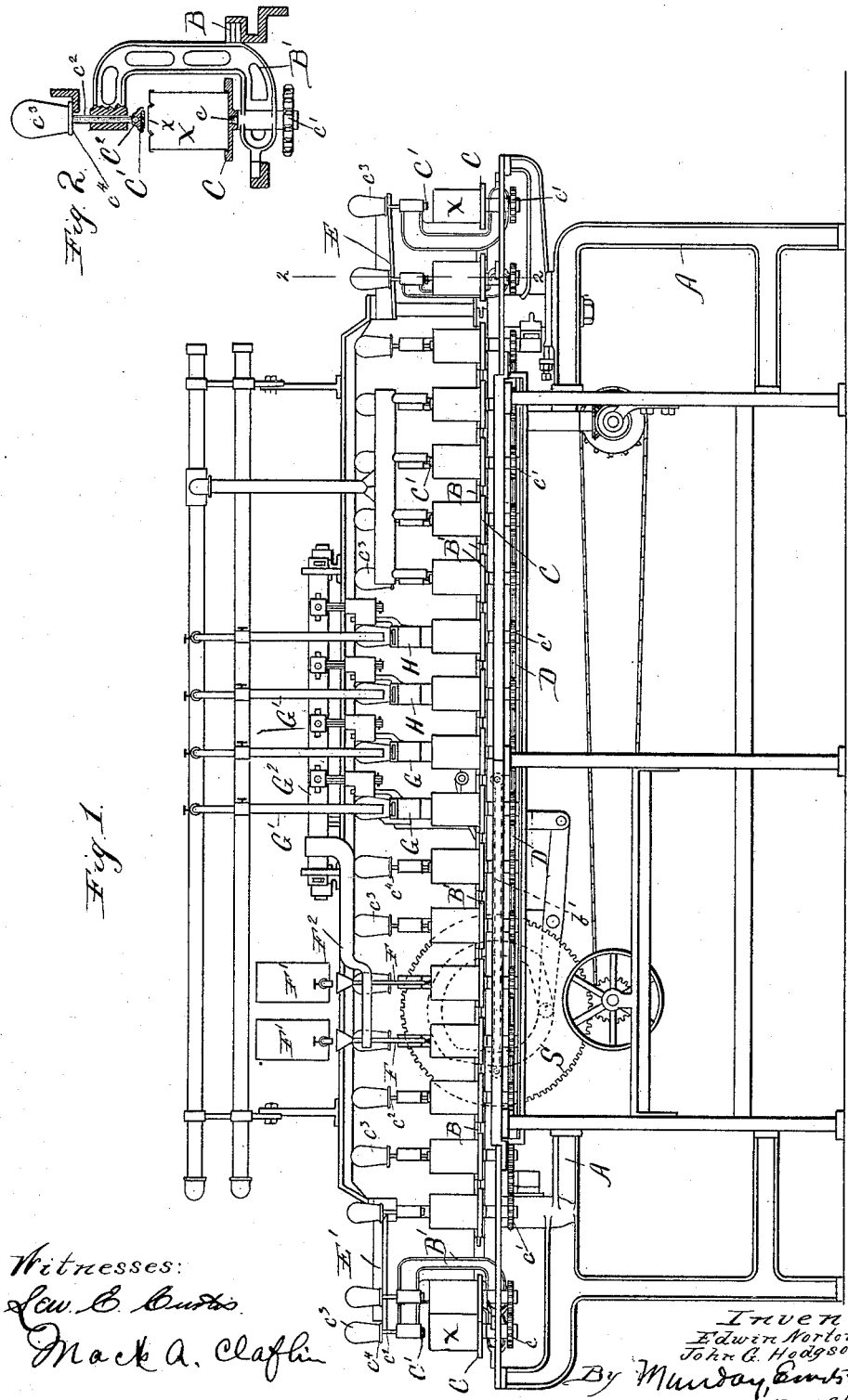
Witnesses:
Geo. E. Curtis
Mack A. Claflin
Inventors:
Edwin Norton
John G. Hodgson
By Munday, Evarts & Adcock
their Attorneys

UNITED STATES PATENT OFFICE.

EDWIN NORTON AND JOHN G. HODGSON, OF MAYWOOD, ASSIGNORS TO SAID EDWIN NORTON, AND OLIVER W. NORTON, OF CHICAGO, ILLINOIS.

CAN-CAP-SOLDERING MACHINE.

SPECIFICATION forming part of Letters Patent No. 408,316, dated August 6, 1889.

Application filed October 1, 1888. Serial No. 286,916. (No model.)

*To all whom it may concern:*

Be it known that we, EDWIN NORTON and JOHN G. HODGSON, citizens of the United States, residing in Maywood, in the county of Cook and State of Illinois, have invented a new and useful Improvement in Can-Cap-Soldering Machines, of which the following is a specification.

Our invention relates to mechanism for soldering the caps or heads of sheet-metal cans, and more particularly to improvements upon the machines shown and described in Letters Patent No. 340,148, dated April 20, 1886, and No. 379,976, dated March 27, 1888.
In the machines shown and described in our said prior patents the upper can-holder disk is pressed down against the can-cap to hold it in place by a stationary cam or guide-bar, and the machine is provided with a single fluxing device and a series of heaters, each can stopping, as it is advanced along by the intermittently-moving carriers, under the fluxing device and under each of the heaters or soldering-tools in turn.
In our present improvement each upper can-holder disk is provided with an independent weight on its vertically-sliding spindle, by which it is pressed down against the can-cap, so that however the height of the cans may vary each can and its cap will always be properly clamped and held during the soldering operation, and the can-holder disk, which presses against the can-cap, is either made of or lined with porcelain or other like equivalent material, so that neither the solder nor the fused or partially-fused tin of the can-cap, with which the holder-disk comes in contact while the cap is heated by the soldering operation, will stick or adhere to the holder-disk, as is the case, to a greater or less extent, where the holder-disk is made of iron or steel or other metal or material capable of being tinned.

In our present improvement, also, the machine is furnished with a series of two or more fluxing or aciding devices and with a like series of two or more heaters or soldering-tools, and the can-carrier is advanced a distance of two or more can-holders at a time, so that a series of two or more cans are operated upon at a time, thus materially facilitating the operation and increasing the capacity of the machine.

Our invention consists in the novel devices and novel combinations of parts and devices herein shown and described, and more particularly pointed out in the claims.

In the accompanying drawings, which form a part of this specification, and in which similar letters of reference indicate like parts, Figure 1 is a side elevation of a machine embodying our invention, and Fig. 2 is a vertical section on line 2 2 of Fig. 1.

In said drawings, A represents the frame of the machine; B, the can-carrrier, preferably consisting of a flexible chain; B', the can-holder brackets or frames with which the carrier is provided.

C and C' are can-holder disks or clamps between which and by which the can is held and revolved during the soldering operation. The spindle $c$ of the lower disk is furnished with a gear or sprocket wheel $c'$, and engages a chain D for revolving the same. The upper can-holder disk C' is made of porcelain or some equivalent non-tinable material, so that neither the solder nor the tin coating of the can-cap $x$, when the same is heated during the soldering operation, will adhere to this holder-disk C'. The porcelain disk C' preferably consists of a thin plate secured in the metal holder-disk $C^2$. The spindle $c^2$ of this upper holder-disk C' is mounted to slide and revolve freely in the holder frame or bracket B', and it is furnished with a weight $c^3$, preferably of cast-iron, which serves to press the holder C' down upon the can-cap $x$ with sufficient force to clamp the cap $x$ firmly in place on the can X during the soldering operation.

The weighted can-holder disks C' are raised at the points where the cans are placed in the machine and the soldered cans taken out of the machine as the carrier B revolves by stationary cams E E'—one at each end of the machine—against which the shoulders or projections $c^4$ on the spindle $c^2$ ride. The shoulders or projections $c^4$ may preferably consist simply of the lower ends of the weights $c^3$.

F is a series of two or more aciding or fluxing devices mounted on the frame of the machine the same distance apart as the revolving can-holders in the carrier B, so that a series of two or more cans may be fluxed at once at each stop of the carrier. As shown in the drawings, the series is composed of only two fluxing devices; but any suitable or greater number may be employed. Each fluxing device may consist, preferably, of a vertically-movable brush, through and by which acid or other flux is supplied to the seam or joint to be soldered from the tanks F' above as the can revolves beneath the brush. Any other suitable known or equivalent form of fluxing or aciding devices may be employed.

G is a series of two or more heaters or soldering-tools. This series of soldering devices is of course like the fluxing devices composed of two, but it may be composed of any greater number of tools desired. The heaters G may preferably consist of vertically-movable hollow irons, each of which is heated by a separate gas-jet G'. The heaters or soldering-tools G may, however, be of any other suitable or well-known construction. A similar second series of heaters or soldering-tools H may preferably be employed, under which the series of cans are brought after being operated upon by the first series of heaters or tools G. The construction of each of these heaters or soldering-tools, and of the vertically-movable bar $G^2$, by which they are all simultaneously operated or moved up and down, is fully shown and described in our said prior patent, No. 379,976, and as the same is now well known to those skilled in the art need not be here repeated in detail. For a full description of the construction and operation of these heater-tools reference is hereby made to said patent, No. 379,976.

The fluxing devices F F are both mounted upon an arm $F^2$, secured to the vertical movable bar $G^2$, and these fluxing-brushes are thus moved up and down simultaneously with the heater-irons G and H.

The can-carrier B moves intermittently the space of two can-holders at a time, so that two cans are simultaneously presented to the two fluxing devices, while two preceding cans are simultaneously presented to the first series of heaters or soldering devices G, and two further preceding cans are at the same time presented to the second series of heaters or soldering devices H. If the series of soldering and fluxing devices should be composed of a greater number than two, the carrier would be given a correspondingly greater movement at each interval, and thus present the required number of cans to the series.

Any well-known or suitable means may be employed for giving the carrier the required intermittent movement. We, however, preferably employ, and have indicated in the drawings, the same mechanism for moving the carrier, as in said Patent No. 340,148, to which reference is made for a full description and illustration of the same. The only change in the driving mechanism here employed from that shown and described in said former patent is simply to remove the wrist-pin on the wheel S farther from the center, so that the link b' will give the carrier twice the movement given to it in said former machine.

The machine which we have here shown and described is designed like the machine shown and described in said Patent No. 379,976, to solder cans, the caps of which are hemmed with solder, as shown and described in Patent No. 364,362, granted to said Edwin Norton June 14, 1887.

For a full description of those parts of the machine indicated in the drawings, to the construction of which our present improvement does not specially relate, and which we have not therefore herein shown or described in detail, we make reference to said prior patents, Nos. 340,148 and 379,976.

We hereby disclaim the devices shown and described in Patents No. 162,880 and No. 295,662.

We claim—

1. The combination, with a number of series of two or more soldering devices arranged in a line one after another, of an intermittently-moving can-carrier furnished with can-holders and mechanism for moving the can-carrier the space of two or more can-holders at a time, so that two or more cans will be simultaneously presented to said series of soldering devices, and each can successively to two or more of said soldering devices, substantially as specified.

2. The combination, with a series of two or more fluxing devices with a number of series of two or more soldering devices arranged in a line one after another, an intermittently-moving carrier for presenting two or more cans at a time to each of said series, and a mechanism for moving said carrier the space of two or more can-holders at a time, so that two or more cans will be simultaneously presented to said series of soldering devices and each can successively to two or more of said soldering devices, substantially as specified.

3. The combination, with a series of two or more fluxing devices, of a series of two or more soldering devices arranged in a line one after another, a second series of two or more soldering devices, an intermittently-moving carrier, and a mechanism for moving said carrier a space of two or more can-holders at a time, so that two or more cans will be simultaneously presented to said series of soldering devices and each can successively to two or more of said soldering devices, substantially as specified.

4. The combination, with a number of series of two or more soldering devices arranged in a line one after another, of an intermittently-moving carrier having revoluble can-holder disks C, sliding weighted can-holder disks C' thereon and a stationary cam for raising said weighted disks, and a mechanism for moving said can-carrier a space of two or more can-holders at a time, so that two or more cans will be simultaneously presented to said series of soldering devices and each can successively to two or more of said soldering devices, substantially as specified.

EDWIN NORTON.
JOHN G. HODGSON.

Witnesses:
EDMUND ADCOCK,
H. M. MUNDAY.